United States Patent Office 3,189,723
Patented June 15, 1965

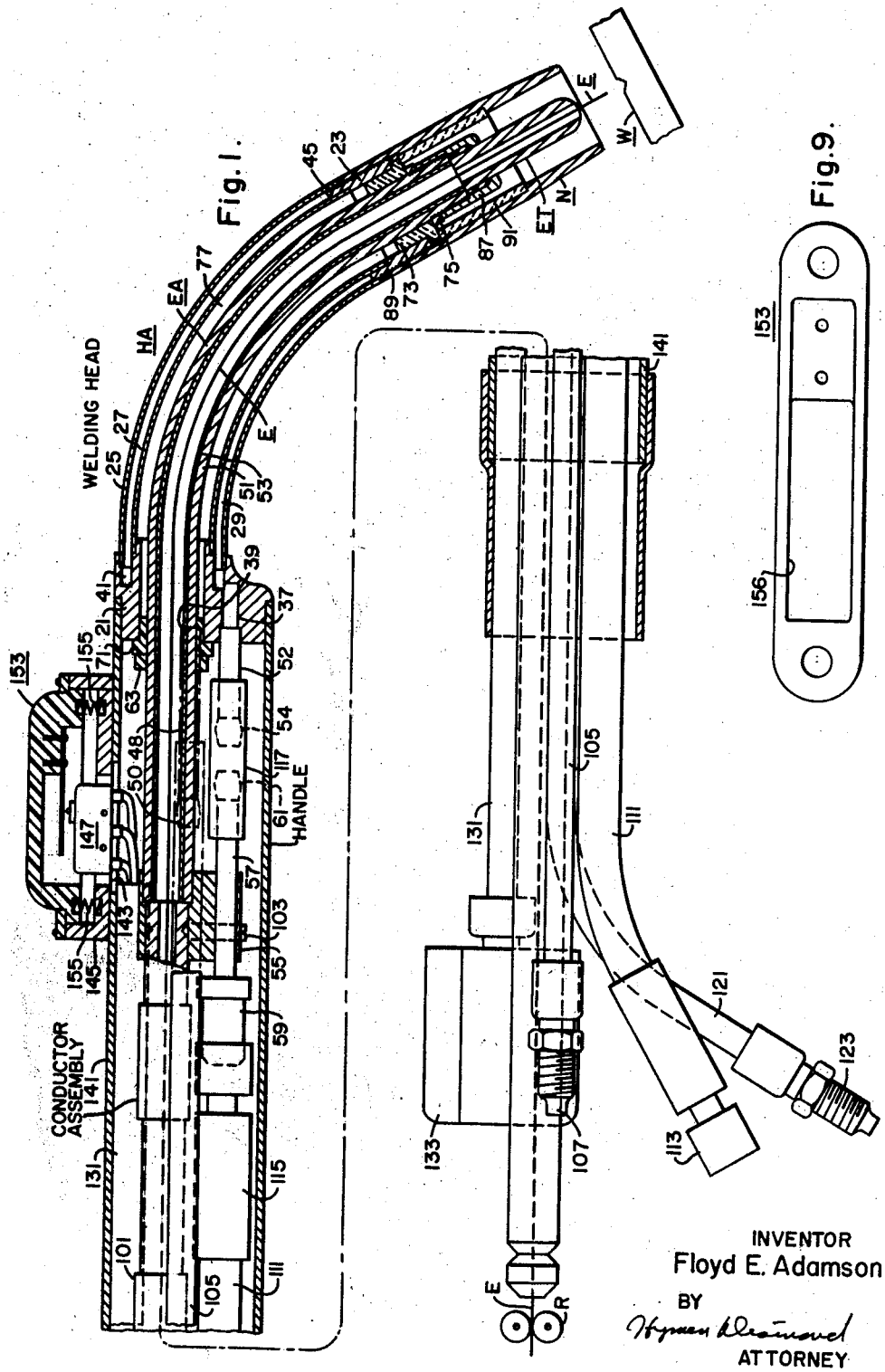

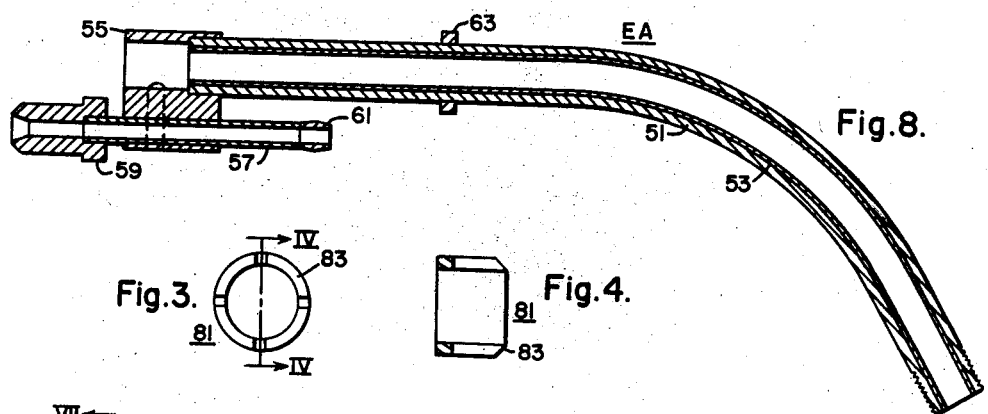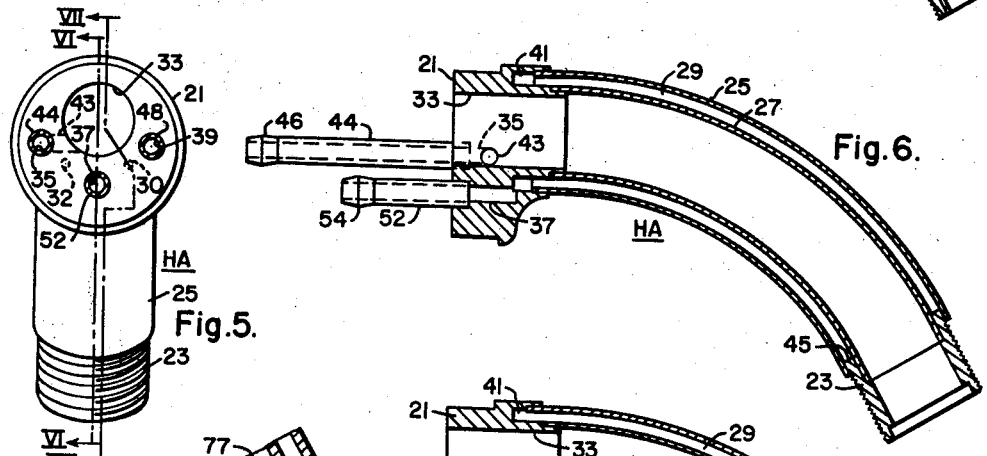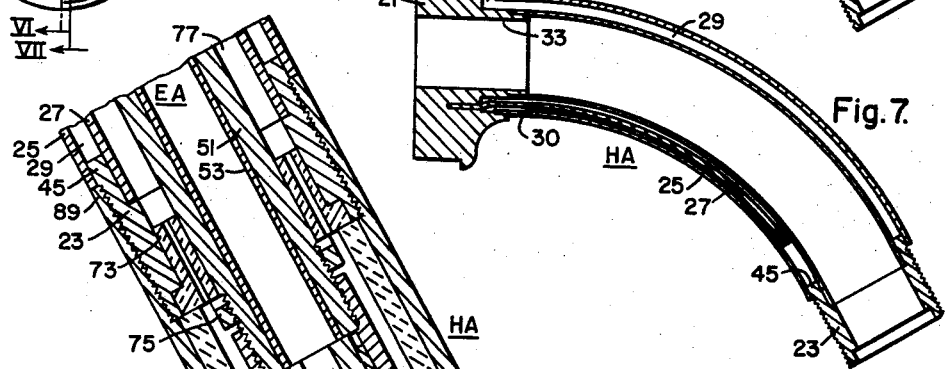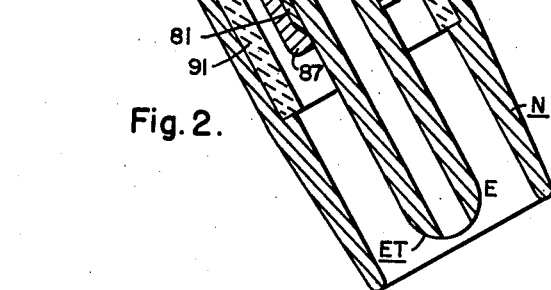

3,189,723
ARC WELDING GUN
Floyd E. Adamson, Eggertsville, N.Y., assignor to Westinghouse Electric Corporation, Pittsburgh, Pa., a corporation of Pennsylvania
Filed Oct. 16, 1962, Ser. No. 230,975
8 Claims. (Cl. 219—130)

This invention relates to arc welding and has particular relationship to guns for arc welding. In its specific aspects this invention is a water-cooled gun or torch of generally goose-neck shape for welding work with a consumable electrode with an arc in a protective shield of gas between the electrode and the work. This invention has a number of important features which are intimately related to such a torch. In its more general aspects, a number of the features of this invention are applicable to guns or torches of other types and certain of the features, may be applied to guns for welding either with a non-consumable or with a consumable electrode.

It is a specific object of this invention to provide an arc welding gun or torch of generally gooseneck form for welding with a consumable electrode in a shield of gas in the use of which the arc current shall be substantially higher than 200 amperes. Such a gun requires that the electrode transmitting channel and the nozzle be cooled by a liquid such as water. In water-cooled gooseneck arc welding torches in accordance with the teachings of the prior art, the nozzle is not effectively cooled and it is a specific object of this invention to provide such a gun in which the nozzle as well as the other parts of the electrode transmitting channel shall be effectively cooled.

In the use of the prior art guns it has also been found that the electrode guide-tube unit through which the electrode is transmitted suffers from excessive wear. It is an object of this invention to provide a goose-neck gun or torch for welding with a consumable electrode in which the electrode guide-tube unit shall have long life.

It is a specific object of this invention to provide an arc welding gun or torch of generally goose-neck form which shall have a novel water cooling channel of simple and low cost construction.

This invention in one of its specific aspects arises from the discovery that in prior-art guns the cooling of the nozzle is ineffective because the nozzle is thermally insulated from the cooling fluid. It has been discovered in arriving at this invention that the necessity for so thermally insulating the nozzle arises from the electrical connection of the cooling channel to the electrode guide-tube unit which is electrically hot. In accordance with this invention a gun for arc welding is provided in which the cooling channel is electrically insulated from the electrode guide-tube unit and thus permits connection of the nozzle to the cooling fluid.

This invention in another of its specific aspects arises from the discovery that the wear of the electrode guide tube unit is caused by the erosion by the electrode as it slides along the interior surface of the guide-tube. This wear is particularly eroding in guns of the goose-neck type in which the electrode guide-tube is curved and there is high pressure between the electrode and the surface of the guide tube means which it engages. In accordance with this invention in its specific aspects, a gun is provided in which the electrode guide-tube is made up of a shell of highly conducting material such as copper lined with wear-resistant material such as stainless steel. The thickness of the copper is substantially greater than that of the stainless steel so that the electrode-guide tube has high conductivity both thermally and electrically. This invention is of particular importance in the case of a gun of goose-neck form where the life of the electrode guide-tube is materially increased.

Another feature of this invention in its specific aspects is the cooling channel which is of simple structure including inner and outer cylindrical shells between which the cooling fluid flows. The shells are provided with barriers so that the cooling fluid flows axially between the shells.

The novel features considered characteristic of this invention are disclosed generally above. For a better understanding of this invention both as to its organization and as to its method of operation, together with additional objects and advantages thereof, reference is made to the following description taken in connection with the accompanying drawings, in which:

FIGURE 1 is a view in side section showing a gun in accordance with the specific aspects of this invention;

FIG. 2 is a view in longitudinal section showing the end of the Welding Head of this gun;

FIG. 3 is a view in end elevation showing the holding collet for the electrode guide-tube tip;

FIG. 4 is a view in section taken along line IV—IV of FIG. 3;

FIG. 5 is a view in end elevation showing the header assembly including the fluid cooling channel;

FIG. 6 is a view in section taken along line VI—VI of FIG. 5;

FIG. 7 is a view in section taken along line VII—VII of FIG. 5;

FIG. 8 is a view in longitudinal section showing the electrode guide-tube assembly; and FIG. 9 is a view in elevation of the trigger of the gun looking towards the bottom of the trigger.

The apparatus shown in the drawings is a gun of generally goose-neck form which includes a Welding Head, a Handle and a Conductor Assembly. The gun is used for welding work W with an electrode E which is advanced through the gun by suitable power driven rollers R. The Conductor Assembly extends into the Handle and is connected in the handle in power transmitting relationship, in gas transmitting relationship and in cooling water interchange relationship with the Welding Head.

The Welding Head includes a header assembly HA, a nozzle N, an electrode guide-tube assembly or unit EA and electrode guide-tube tip ET. The electrode guide-tube assembly EA and the tip ET serve to transmit the electrode E into the arc between the electrode E and the work W. The nozzle N serves to concentrate a shielding gas around the arc. Fluid cooling is provided by the header assembly HA.

The header assembly HA includes a rear header 21 and a front header 23 to which are joined tubes or shells 25 and 27 of generally goose-neck form. The headers 21 and 23 are brazed fluid tight to the tubes 25 and 27 forming a closed annular space 29 between the tubes through which cooling fluid flows. The fluid is guided axially by wires 30 and 32 extending axially in the space 29.

The rear header (FIGS. 5, 6 and 7) is a generally cylindrical block of a conducting material such as brass having an eccentrically displaced shouldered opening 33 and a plurality of counterbored openings 35, 37, 39 of smaller diameter extending axially therethrough. The opposite end of the rear header 21 has a shouldered groove 41.

One of the counterbored openings 35 serves to transmit the shielding gas. This opening is connected to the eccentric opening 33 by a lateral channel 43. A tube 44 having a sleeve 46 at its end is brazed into the opening 35 (FIG. 6). In forming the gas passage a lateral opening is bored through the rear header 21. This opening passes through the gas opening 35 and through the eccentric opening 33. The portion of this lateral opening extending from the opening 35 to the outer wall of the rear header 21 is plugged leaving the lateral opening 43. The tube 44 conducting the gas is then brazed into the gas opening 35 with its end abutting the shoulder formed by the counterbore and its opening in communication with 43. The other openings 37 and 39 serve to interchange the cooling fluid usually water. The water is conducted into the Welding Head through one of these openings 39 and away from the Welding Head through the other 37. The inflow of water is through a tube 48 having a sleeve 50 brazed in the opening 39 (FIG. 1) and the outflow of water is through a tube 52 having a sleeve 54 brazed in the opening 37.

The front header 23 is composed of electrically and thermally conducting material such as copper and is of generally hollow shouldered cylindrical form threaded on the outside. The inner and outer shells 25 and 27 are brazed to the walls of the groove 41 of the rear header 21 and to the inwardly extending projection 45 of the front header 23 at all joints abutting the shoulders. A rigid structure of generally goose-neck shape with the circumferential space 29 between the inner and outer shells 25 and 27 is thus formed. In producing the header assembly HA the inner shell 27 is first brazed to the header 21. Then the wires 30 and 32 are inserted in openings in the rear header 21 and brazed to the inner shell in such positions that they terminate near the end of the shell 27 where the header 23 is to be secured. The outer shell 25 is then brazed to header 21. These wires 30 and 32 serve to direct the cooling fluid so that it flows axially in the space 29 defined by the inner and outer shells 25 and 27. The front header 23 is then brazed to the ends of shells 25 and 27.

The electrode guide-tube assembly EA (FIG. 8) has a linear portion from which a generally goose-neck portion extends and consists of a tube 51 of copper or other highly electrically conducting material having a liner 53 of wear resistant material such as stainless steel. ASE Type 304 stainless steel is suitable. The thickness of the copper tubing 51 is substantially greater than the thickness of the liner 53 so that the electrode guide-tube assembly has good or high electrical and thermal conductivity.

The tube 51 is threaded at the front end and at the rear end a shouldered collar 55 is brazed thereto. A tube 57 carrying a fitting 59 at one end and a collar 61 at the other is suspended from the collar 55. The tube conducts the cooling water away from the channel 29. The connection to the hot (ungrounded) terminal of the power supply is to the fitting 59 and through this fitting 59 and the collar 55 to the guide-tube assembly EA. A collar 63 is brazed to the copper tube 51 intermediate its ends and near the region where the goose-neck portion starts.

The electrode guide-tube assembly EA is electrically hot and is mounted in the header assembly HA electrically insulated from this assembly. For this purpose the guide-tube assembly EA is supported in shouldered electrically insulating collars 71 and 73 which extend respectively into the rear header 21 and the front header 23 and serve as bearings for the guide-tube assembly EA. The insulator 71 may be composed of a material such as melamine but the insulator 73 must be composed of temperature resistant material such as Dow No. 301 glass-filled silicone. The insulator 73 has axial holes through which shielding gas may flow from the space 77 between the guide-tube assembly EA and the inner shell 27 into the space between the tip ET and the nozzle N.

The electrode guide-tube assembly EA is secured between the collars 71 and 73 by a nut 75 which is screwed onto the threaded end of the guide-tube assembly EA and engages the collar 73 in the front header 23 and forces the collar 63 at the junction of the straight and goose-neck portions of the electrode guide-tube assembly EA into firm engagement with the collar 71 in the rear header 21.

The electrode guide-tube tip ET is secured readily replaceable in electrode communicating relationship with the guide-tube assembly EA. A number of tips ET which may have dimensions to correspond to the various electrodes to be used in the gun may be used. The tip is held by a split chuck or collet 81 (FIGS. 3 and 4) which has a tapered end 83. The collet 81 and the tip ET are secured to the end of the guide-tube assembly EA by a cap 87 which is secured onto the end of the assembly.

The nozzle N is composed of a material such as copper and is of generally hollow cylindrical form slightly tapered at the end near the arc. The other end of the nozzle N has an internally threaded projection 89 extending from a shoulder. The end 89 of the nozzle is screwed onto the front header 23. The nozzle has a ceramic liner 91 which when the nozzle is screwed in abuts a shoulder of the nozzle at an end and the rim of the insulating collar 73 at the other. Typically such a liner may be purchased from Diamonite Corporation. The liner 91 prevents short circuiting of the cap 87 to the nozzle N by particles of metal sprayed from the arc.

The Conductor Assembly includes a flexible conduit 101 for conducting the electrode E. This conduit 101 extends through the Handle and into the collar 55 brazed to the electrode guide-tube assembly EA and is secured in this collar 55 by a set screw 103. The electrode E passes through this flexible conduit 101 and into the guide-tube assembly EA whence it passes through the guide-tube tip ET into the arc.

The Conductor Assembly also includes a cooling fluid inlet hose 105 which conducts water to the channel 29 and has a fitting 107 for connection to a water supply. This hose 105 passes adjacent the end of the the assembly EA and connects to the sleeve 50 of the inlet tube 48 brazed to the inlet opening 39 in the rear header 21. The sleeve 50 has a protuberance which serves to assure a water tight seal.

The Conductor Assembly also includes an outlet conductor 111. This conductor 111 is provided with a terminal 113 for connection to a welding power supply and connects to a water sink. The conductor 111 is also provided with a terminal 115 connected to the fitting 59 through which the power supply is connected to the guide-tube assembly EA. The fitting 59 is communicative with the tube 57. An insulating tube 117 connects the tubes 57 and 52 extending over the sleeves 54 and 61. The tube 117 conducts water from tube 52 to tube 57 and sealed water-tight by the sleeves 54 and 61. The tube 117 insulates the header 21 and its associated parts from the conductor 111.

The Conductor Assembly also includes a hose 121 for connection to a shielding gas supply. This hose is provided with a suitable fitting 123 for effecting the connection. This hose 121 is connected gas tight to the sleeve 46 on the tube 44 and supplies gas to the opening 33 and the space 77 between the assembly EA and the inner shell 27. The Conductor Assembly also includes a cable 131 terminating in a connector 133 which includes the conductors for controlling the operation of the torch. The flexible conduit 101 and the gas and fluid conductors 105, 111, 121, 131 are suitably clamped and tapered together so that they are prevented from becoming separated.

The Handle includes a shell 141 which is bolted to the rear header 21. This shell 141 is provided with a slot or groove 143. A bracket 145 is welded to shell 141 over the groove 143. A switch 147 is bolted to a side wall of this bracket. A generally oval-shaped trigger 153 is suspended on coil springs 155 in the bracket 145. The trigger has a cavity 156 through which a leaf spring 157 extends over the button 159 of the switch. By pressing downwardly on the trigger 153 against the force of the coil springs 155, the control conductors in the control cable 131 may be connected for actuation of the apparatus used in conjunction with the torch.

The torch disclosed herein is of relatively simple and low cost structure and has the facility for effective cooling of the electrode guide-tube assembly EA and of the nozzle N. The fluid channel consists of the relatively simple inner and outer shells 25 and 27 with wires 30 and 32 interposed to constrain the fluid to flow axially within the shells. The header is composed of a material such as copper or brass and thus is an effective thermal conductor rendering the cooling highly effective. At the other end the cooling fluid is connected through the front header 23 which is of copper or brass and has high thermal conductivity to the nozzle N. The connection is a firm thermal connection through the interlocked threads by means of which the nozzle N is suspended from the front header 23. The gas for shielding flows through the space between the inner shell 27 of the fluid channel and the copper tube 51 of the electrode guide-tube assembly EA and thence through the holes in the insulating collar 73. The gas is cooled by its contact with the inner shell 73. The electrode guide tube EA is cooled partly by radiating to the inner shell 27. In addition, the electrode guide is cooled by the collar 55 through which it passes and through which the outflowing cooling water also passes. This outflowing water is sufficiently cool to cool the guide tube.

While a preferred embodiment of this invention has been disclosed herein many modifications thereof are feasible. This invention then is not to be restricted except insofar as is necessitated by the spirit of the prior art.

I claim as my invention:

1. As an article of manufacture a consumable electrode guide-tube assembly for an arc welding gun including a tube of a highly electrically conducting material such as copper having an internal liner of lower electrically conducting wear-resistant material such as stainless steel, the thickness of said tube being substantially greater than the thickness of said liner.

2. A gun for welding work with a consumable electrode with an arc, including electrode guide-tube means for conducting an electrode to said arc, a channel for conducting cooling fluid, said channel being formed between an outer thermally conducting shell encircling said guide-tube means and an inner thermally conducting shell encircling said guide-tube means, and means interconnecting said shells and said guide-tube means and forming a path of high thermal conductivity between said fluid and said guide-tube means.

3. A gun for welding work with a consumable electrode with an arc, including electrode guide-tube means for conducting an electrode to said arc, a channel for conducting cooling fluid, said channel being formed between an outer cylindrical shell encircling said guide-tube means and an inner cylindrical shell encircling said guide-tube means and said channel being in cooling relationship with said guide-tube means and means in said channel between said shells for restraining said fluid to flow axially along said shell.

4. A gun for welding work with a consumable electrode with an arc between said electrode and work, including electrode guide-tube means for conducting said electrode into arc-firing-and-maintaining relationship with said work, a channel connected to said guide-tube means for conducting cooling fluid in cooling relationship with said guide-tube means, and common power-fluid supply means connected to said channel for supplying electrical power and for conducting said fluid to said channel, said supply means including fluid input means and fluid output means and fluid-transmitting electrical insulating means interposed between said input and output means for electrically insulating said input means from said output means, said output means being connected to said channel and said input means conducting said electrical power, and an electrical power conducting connection between said input means and said guide-tube means.

5. A welding gun for welding work with a consumable electrode with an arc between said electrode and work including an electrode guide-tube assembly in the form of a goose-neck, said assembly including a tube of highly electrically conducting material such as copper having a liner of a material of lower electrical conductivity and of wear resistant material such as stainless steel, the thickness of said tube being substantially greater than the thickness of said liner, and means for advancing said electrode through said assembly with said electrode in sliding engagement with said liner.

6. A gun for welding work with a consumable electrode with an arc between said electrode and work in a gaseous shield, including, electrode guide-tube means for conducting said electrode to said arc, a channel for conducting a cooling fluid in cooling relationship with said guide-tube means, a first tube for conducting fluid in electrical conductive connection, and in fluid interchange relationship, with said channel, an electrical insulator, having an opening, a second tube for conducting fluid in fluid interchange relationship with said first tube through said opening but electrically insulated from said first tube by said insulator, a nozzle encircling said guide-tube means near said arc for conducting gas to shield said arc, said nozzle being devoid of cavities for conducting said fluid, an electrically conductive connection between said second conductor and said guide-tube means for supplying welding current through said electrode, a connection establishing a path of high thermal conductivity between said fluid in said channel and said nozzle, said connection also establishing an electrically conductive path between said nozzle and channel, and means connected to said guide-tube means for insulating said guide-tube means electrically from said channel and nozzle.

7. A gun for welding work with an electrode with an arc in a shield of gas between said electrode and work, including, a first channel terminating in a nozzle for conducting said gas to shield said arc, means, connected to said channel, for supporting said electrode in arc-firing-and-maintaining relationship with said work, a second channel for conducting cooling fluid, a first tube for conducting cooling fluid in electrical conductive connection, and cooling-fluid interchange relationship, with said channel, an electrical insulator having an opening, a second tube electrically insulated from said first tube by said insulator but in cooling-fluid interchange relationship with said first tube through said opening, an electrical connection between said supporting means and said second tube for conducting electrical current to said arc through said electrode, a connection establishing a path of high thermal conductivity between said fluid and said nozzle, said last-named connection including an electrically conductive connection between said nozzle and second channel, and means connected to said supporting means for insulating said supporting means electrically from said second channel and nozzle.

8. The welding gun of claim 7 wherein the nozzle is devoid of cavities for transmitting fluid.

References Cited by the Examiner

UNITED STATES PATENTS

| | | | |
|---|---|---|---|
| 2,478,525 | 8/49 | Cutrer | 219—130 |
| 2,903,567 | 9/59 | Piekarski et al. | 219—130 |

RICHARD M. WOOD, *Primary Examiner.*